April 27, 1965 E. R. ROBUCK 3,181,070
WAVE FREQUENCY CONVERTER USING BEAT OPERATION AND HARMONIC CIRCUITS
Filed Aug. 11, 1960
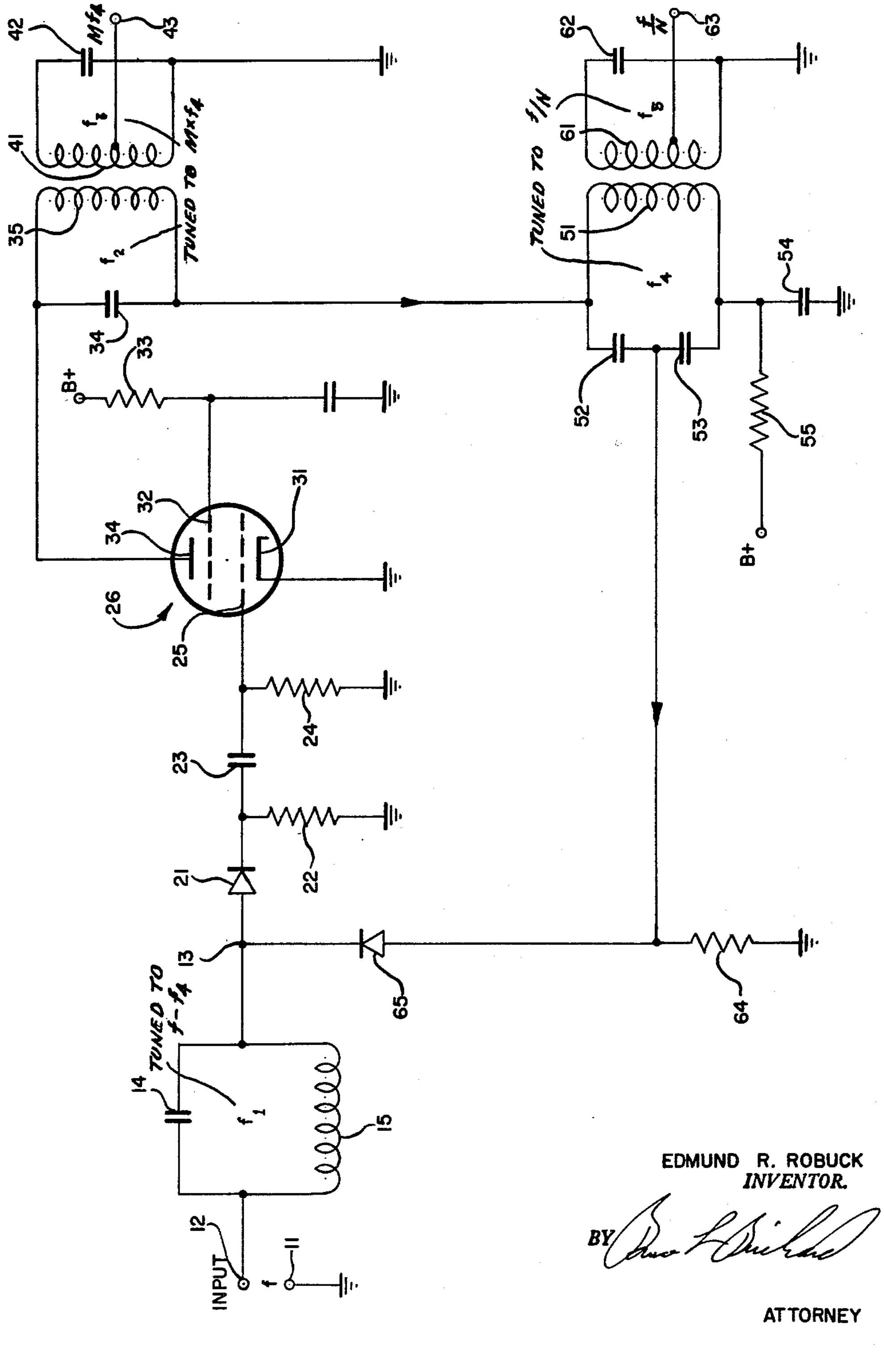
EDMUND R. ROBUCK
*INVENTOR.*
BY [signature]
ATTORNEY 3,181,070

WAVE FREQUENCY CONVERTER USING BEAT OPERATION AND HARMONIC CIRCUITS

Edmund R. Robuck, Los Angeles, Calif., assignor to Hoffman Electronics Corporation, a corporation of California Filed Aug. 11, 1960, Ser. No. 48,967
5 Claims. (Cl. 328—25)

The present invention relates to fractional frequency generators, and more particularly to electronic circuits that can be used to fractionally multiply a given frequency over a wide range of given frequencies.

The terms "frequency divider" and "fractional frequency generator" are almost synonymous, but there is a slight difference. A frequency divider and a fractional frequency generator would be identical if the fraction is of the form $1/N$, N being an integer. The difference between the two occurs when the fraction is of the form $M/N$, where M and N are different integers. Since it is a straightforward procedure to generate harmonics either before, after or within a frequency divider, the resulting output frequency can always be an $M/N$ fraction of some input frequency. Thus, the divider itself is the main concern and the terms "fractional frequency generator" and "frequency divider" can be used interchangeably, for all practical purposes.

There is an increasing need at the present time in a variety of specialized computers, precise time and frequency measuring instruments, and synchronized communication systems, to name only a few applications, to be able to fractionally multiply a given frequency. Many circuits have been developed to produce an output frequency that is an exact submultiple or fraction of a source frequency, but such circuits are either bulky, complex, expensive, or require critical adjustments. Furthermore, the same circuit could not be used to fractionally multiply a given input frequency to obtain both higher and lower frequencies over a wide range of input frequencies. Thus, a significant advancement in the state of the art for multichannel single sideband communication would be a simple fractional frequency generator that would be capable of generating a frequency at rational fractions of a stable source frequency and able to maintain the same frequency stability as that source.

It is an object of the present invention, therefore, to provide a novel fractional frequency generator.

It is another object of the present invention to provide a simple and inexpensive electronic circuit that can be used to accurately fractionally multiply a given input frequency over a wide range of input frequencies.

According to the present invention, a fractional frequency generator comprises a circuit in which the output is fed back and mixed with the input after the input has passed through a tank circuit tuned to the difference between the input and output frequencies. The tank circuit is coupled to two mixing means such as semiconductor diodes. One diode is coupled to an amplifier, which is in turn coupled to a second tank circuit. The second tank is coupled back to the second diode. The same circuit can be used for obtaining both higher and lower frequencies from the same input frequency, both the input and higher frequencies being integral multiples of the lower frequency over a wide range of input frequencies.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a schematic diagram of a circuit according to the present invention.

Referring now to the drawing, the sole figure shows input terminal 11 connected to ground and input terminal 12 connected to junction 13 through the parallel tank network of capacitor 14 and coil 15, which are tuned to frequency $f_1$. The anode of semiconductor diode 21 is connected to junction 13, and its cathode is connected to ground through resistor 22 and to capacitor 23, which is in turn connected to ground through resistor 24 and to grid 25 of vacuum tube amplifier 26. Cathode 31 of amplifier 26 is grounded and screen 32 is connected to a B+ voltage source through resistor 33. Plate 34 of amplifier 26 is connected to the parallel tank network of capacitor 34 and coil 35, which are tuned to frequency $f_2$. Coil 35 is inductively coupled to the parallel tank network of coil 41 and capacitor 42, which are tuned to frequency $f_3$. One junction between coil 41 and capacitor 42 is grounded. Output terminal 43 is connected to a tap on coil 41.

One junction between capacitor 34 and coil 35 is connected to the parallel tank network of coil 51 and series-connected capacitors 52 and 53, the net work being tuned to frequency $f_4$. The junction between coil 51 and capacitor 53 is grounded through capacitor 54 and connected to a B+ voltage source through resistor 55. Coil 51 is inductively coupled to the parallel tank network of coil 61 and capacitor 62, which are tuned to frequency $f_5$. One junction between coil 61 and capacitor 62 is grounded. Output terminal 63 is connected to a tap on coil 61.

The junction between capacitors 52 and 53 is connected to ground through resistor 64 and to the anode of semiconductor diode 65, the cathode of which is connected to junction 13. The operation of the circuit will now be described.

Initially, the voltage amplitude of the input must be greater than the threshold of diode 21, and as long as the gain of the amplifier is quite large there will be enough amplification to excite output tank $f_4$ at some frequency. At first there will be no D.-C. voltage biasing diode 65, and if the amplification is large enough to overcome the zero biased threshold level, some feedback will result, exciting tank $f_1$, which functions the same as the idling tank of a parametric amplifier. Once there is feedback, the circuit very quickly reaches a steady state wherein diode 65 generates an $(N\pm1)$ harmonic from from the output which appears across the idling tank. Diode 21 mixes the idling frequency voltage with the input to give mixing products. One of the main mixing products is the difference between the idling frequency and the input frequency, which is the output frequency desired. Diode 65 is capacitively coupled to the output tank and a D.-C. voltage develops in a direction to back bias diode 65 so that it is in a non-conducting state for most of the output cycle, and the conduction current of diode 65 can be considered to be approximately a clipped sine wave. The harmonics generated by this clipped sine wave action are a function of the conduction angle and the conducting voltage. The resulting harmonic voltage across the idling tank is actually rather complicated. During conduction of diode 65, a voltage builds up on the capacitor in the idling tank in a mathematically linear manner until the resulting voltage from junction 13 to ground is greater than zero. At that time, diode 21 begins conducting somewhat and nonlinearly decreases the build up of charge on the idling tank capacitor. The idling tank is loaded in a nonlinear manner during the mixing action of diode 21. Thus, the exact idling frequency voltage over an entire cycle is nonlinear and is not a straight-forward calculation. One side of mixing diode 21 is returned to ground so that there will be no D.-C. bias built up. The input to the amplifier is essentially a series of pulses which are then amplified to the output tank. The output tank will pick out the $f_4$ component and the regenerative action will be complete.

It should be noted that the action of diode 65 is not solely that of generating harmonics, but also involves some mixing. Since the effect of D.-C. bias on diode 65 increases the higher order terms of a power series expansion, while decreasing the first mixing coefficient, there is much less mixing action than with diode 21, which has zero bias. However, there is some tendency to regenerate at a mixing frequency, rather than a subharmonic. It is apparent that mixing of the output and input across diode 65 will generate an idling frequency which when mixed with the input across diode 21 will support an output frequency based upon mixing rather than harmonic generation. As long as the harmonic generation is large, the mixing across diode 65 will be relatively suppressed, and the generator locks on to the subharmonic. When the loop gain of the system is relatively large for a mixing frequency, a combination of the two frequencies results in the output. This output is then the subharmonic frequency and is amplitude modulated at the difference frequency between the subharmonic and the mixing frequency. The mixing frequency is lower than the natural resonant frequency of the output tank. In other words, the circuit in an excited state attempts to operate as a tuned grid, tuned plate oscillator, as well as a regenerative subharmonic oscillator.

The generator should function properly regardless of the polarity of the diodes, so long as they face in the same direction in the feedback loop and the amplifier gives a 180° phase reversal. Diode 21 may be reversed if a high input impedance amplifier having positive gain is used. Since any positive gain single stage vacuum tube or transistor amplifier has a low input impedance and will not have sufficient overall gain from junction 13 to the output tank, a two-stage high input impedance amplifier would be required. The input and output voltages should be approximately 180° out of phase as the $N\pm1$ harmonic is being generated, in order for diode 65 to be able to conduct sufficiently to generate the desired harmonic.

The diodes should be as nonlinear as possible, but they are not critical. The amplifier should have as large a gain as possible, but it also is not critical, unless maximum stability range is required, and the gain is above some minimum level. The location of the tap point on the output tank circuit is determined by the sensitivity of the overall generator, as well as by the stability range.

Diode 21 and the amplifier can be combined into a single transistor or vacuum tube by biasing the amplifier at cutoff. A grounded emitter npn transistor or grounded cathode vacuum tube would produce proper mixing and amplification. The amplification of both tubes and transistors, however, is much lower near cutoff than in the more conducting region, so that circuit performance of the frequency divider suffers as a result of combining the two operations in a single element.

To increase the stability range, the characteristic impedance of the output tank may be increased and less bias can be developed across the harmonic generating diode, but both of these changes deteriorate the output waveform. Conversely, larger bias on the harmonic generating diode causes less loading of the output tank and larger output amplitude, resulting in better output waveform and less stability range.

By way of example, when an input signal $f$, of 1000 kilocycles, is applied to input terminals 11 and 12, noise present in the circuit rings the tank circuit formed by coil 51 and capacitors 52 and 53 at the frequency $f_4$. The presence of the tank circuit formed by capacitor 14 and coil 15, which are tuned to the difference between $f$ and $f_4$, enables the level of the signal present in the tank circuit formed by coil 51 and capacitors 52 and 53 to build up until it is sustained. Thus, where $f_4$ is equal to 125 kilocycles, $f_1=f-f_4=1000-125=875$ kilocycles.

The following relationships hold true:

$$f_3=f_2=Mf_4$$

where M is an integer, and $$f_5=f_4=f/N$$

where N is an integer.

In the example given, where $N=8$ and $M=9$, $f_4=f/N=1000/8=125$ kilocycles, which obviously is less than the input frequency, and $f_3=Mf_4=9(125)=1125$ kilocycles, which is greater than the input frequency. The output can be taken from either output terminal 63 or 43, depending upon whether it is desired to divide or multiply the frequency of the input signal, $f$. The tank circuits tuned to $f_3$ and $f_5$ are used for filtering purposes and to remove the harmonics. If it is not necessary to have a circuit that can multiply in addition to being able to divide, either $f_2$ and $f_3$ can be made smaller than $f$, or the tank circuits tuned to $f_2$ and $f_3$ can be eliminated from the circuit.

The output frequency at terminal 63 locks to an exact submultiple of the input frequency applied to terminal 12 over a very wide input frequency range. For example, where N varies from 4 to 10, $f_1$ can vary from approximately 30% to 10%, respectively, without any serious consequences, whereas conventional frequency dividers are limited to about a 2% variation in input frequency. The greater range is achieved by the novel method of generating the harmonics. That is, semiconductor diode 65, instead of a conventional tuned amplifier, is used to generate the harmonics.

The present circuit is very simple and does not require critical adjustments, since semiconductor diodes are used for both harmonic generation and mixing. Diode 21 functions as a mixer for frequencies $f$ and $f_1$, and diode 65 functions both as a mixer for frequencies $f$ and $f_4$, and as a harmonic generator.

One advantage of the present circuit is that it has a small threshold level because of the inherent threshold of semiconductor diodes in the conducting region. Above that level, the circuit is self starting and does not require transient or shock excitation to initiate regeneration.

Another advantage of the present circuit is that the amplitude of its output voltage is directly proportional to the amplitude of its input voltage. That is, as the input increases in amplitude above the threshold, the output level follows almost linearly, thereby allowing the possibility of amplitude modulated output. If the circuit is overdriven, however, there is little variation in the amplitude of the output voltage, regardless of whether there is variation in the amplitude of the input voltage. Thus, a relatively constant output can be generated over a significant range of input amplitude variation.

If desired, as already explained, diode 21 can be eliminated and its mixing function can be performed in tube 26, but, because of the higher gain obtained when tube 26 is operated as an amplifier, among other reasons, the performance of the circuit is not nearly as satisfactory without diode 21.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A fractional frequency generator for generating from an input frequency at least one output frequency which is $M/N$ times the input frequency, M and N being digits other than unity, said generator comprising:

(*a*) an input terminal coupled, through a first tank circuit tuned to a first frequency and having an output terminal, to a first unilaterally conductive mixing device having an input terminal, (*b*) means coupling the output of said first mixing device through a pair of series-connected tank circuits to a second unilaterally conductive mixing device, (*c*) means coupling the output of said second mixing device to both the output terminal of said first tank circuit and the input terminal of said first mixing device, and (*d*) means for deriving an output signal from at least one of said pair of series-connected tank circuits;

(*e*) the sum of the said first frequency and the resonant frequency of one of said series-connected tank circuits being equal to the input frequency, and (*f*) said input frequency and the frequency of the other of said series-connected tank circuits being respectively different multiples of the frequency of said one of said series-connected tank circuits.

2. A fractional frequency generator in accordance with claim 1, in which said mixing devices are poled for conduction in the same sense with respect to the series path through said devices and said series-connected tank circuits.

3. A fractional frequency generator in accordance with claim 1, in which the means coupling the output of said first mixing device through said pair of series-connected tank circuits to the second unilaterally conductive mixing device, includes an amplifier.

4. The combination of claim 1, in which said mixing devices are respective semiconductor diodes having unlike electrodes connected together.

5. The combination of claim 1, in which the means of clause (*d*) comprises independent output circuits respectively coupled to said series-connected tank circuits.

References Cited by the Examiner

UNITED STATES PATENTS

| | | | |
|---|---|---|---|
| 2,159,595 | 5/39 | Miller | 328—25 |
| 2,344,678 | 3/44 | Crosby | 331—51 |
| 2,492,218 | 12/49 | Guanella | 331—43 |

ARTHUR GAUSS, *Primary Examiner.*

HERMAN K. SAALBACH, JOHN W. HUCKERT, *Examiners.*